SYNCHRONOUS OSCILLATOR FOR GENERATING SINE WAVE SYNCHRONIZED IN PHASE AND FREQUENCY WITH PERIODIC INPUT SIGNAL

Filed Dec. 19, 1962 2 Sheets-Sheet 1

Inventors
Veljko Milenkovic
Carl Zaander
Olson, Mechlenburger
von Holst, Pendleton & Neuman
Attorneys Inventors
Veljko Milenkovic
Carl Zaander
Olson, Mecklenburger
von Holst, Pendleton & Neuman
Attorneys 3,239,767
SYNCHRONOUS OSCILLATOR FOR GENERATING SINE WAVE SYNCHRONIZED IN PHASE AND FREQUENCY WITH PERIODIC INPUT SIGNAL Veljko Milenkovic, Norridge, and Carl Zaander, Clarendon Hills, Ill., assignors to American Machine & Foundry Company, a corporation of New Jersey
Filed Dec. 19, 1962, Ser. No. 245,829
12 Claims. (Cl. 328—155)

This invention relates to a synchronized oscillator, and more particularly to an oscillator for generating a sine wave which is in synchronism both in frequency and in phase with a periodic input signal.

In the prior art, synchronous oscillators have been known which operate on a feedback principle, by which a frequency error of the oscillator is detected, and this error signal employed to raise or lower the frequency (or change the phase) of the oscillator so as to minimize the magnitude of the error signal.

This scheme has proved satisfactory for some purposes, but has an inherent limitation in its operation since for small errors the correction force is also correspondingly small, which brings about a range or tolerance within which there is sensibly no correction for frequency (or phase) error. Even with integrating techniques a significant error or tolerance exists and the response is relatively slow, usually requiring at least several cycles. These are disadvantages which make feedback type synchronization impractical for some uses, particularly when the synchronism must be substantially instantaneous, and where the phase of the output wave produced is also desired to be in synchronism with the phase of the input pulses.

The disadvantages found in feedback type synchronization are eliminated in the present invention, in which the magnitude of the output wave form is returned to a predetermined voltage value at the same time during each cycle, which time should have a fixed relation to the occurrence of some periodic input phenomenon, giving a resultant wave form having a fundamental frequency corresponding exactly to the frequency having its period between adjacent input pulses, and a phase which has a fixed relation to the input pulses. Harmonics in the oscillator output signal, which are present when the natural frequency of the free running oscillator is not equal to the frequency of the input pulses, are filtered out with a low pass filter, which results in substantially a sine wave at the fundamental frequency of the resulting wave form.

Accordingly, it is the principal object of the present invention to provide a simple and inexpensive synchronous oscillator which is adapted to provide a sine wave output synchronized both in frequency and in phase with a synchronizing wave form.

It is another object of the present invention to provide a synchronous oscillator producing a signal synchronized in frequency and in phase with a synchronizing wave form, which oscillator is effective at least once during each cycle to fully eliminate any frequency or phasic error with refence to the synchronizing wave form.

A further object of the present invention is to provide a synchronous oscillator having a high degree of frequency precision without requiring high precision components.

Another object of the present invention is to provide an oscillator which generates a repetitive wave form of a period equal to that of a synchronizing wave form, the oscillator having a filter for passing only the fundamental frequency of such wave form.

Other and further objects and advantages of the present invention will become manifest from a consideration of this specification, the accompanying drawings, and the appended claims.

In accordance with one embodiment of my invention, there is provided means responsive to a synchronizing wave form for generating a square wave having a period equal to the period of the synchronizing wave form which is utililed with a clamp means to establish a predetermined potential during half of each square wave cycle. A free running oscillator produces a sine wave having its average value equal to approximately the predetermined potential and is connected to a means which clamps the output of the oscillator at the predetermined potential when the potential of the output ends to exceed said predetermined potential during the period in which the square wave output is clamped thus delaying or advancing the phase of the oscillator output during each asynchronous cycle. The oscillator output is applied to means for filtering the clamped output of said oscillator to eliminate substantially all harmonics of the fundamental frequency of said output some of which may have been generated during the clamping operation.

For a more complete understanding of the invention, reference will now be made to the accompanying drawings in which.

Figure 1:
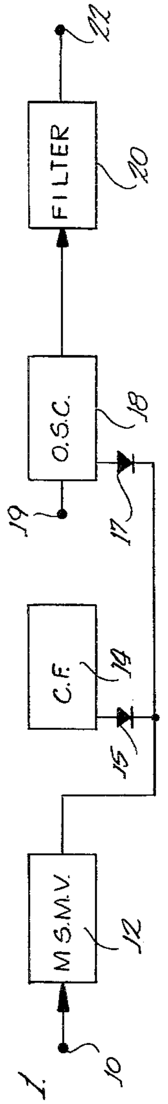
FIG. 1 is a functional block diagram of a synchronous oscillator constructed in accordance with the present invention.

Referring now to FIG. 1, a source of pulses to which a sine wave is desired to be synchronized is applied to to terminal 10 which is the input of a monostable multivibrator 12. The more negative value of the square wave output of the monostable multivibrator 12 is clamped by a cathode follower 14 through a diode 15, and the delay time of the multivibrator is such that a square wave having equal positive and negative portions is produced by the pulses applied to the terminal 10. A free running oscillator is shown at 18, connected to a predetermined potential applied to the terminal 19, such oscillator being synchronized with the square wave output of the multivibrator 12 by clamping a signal within the oscillator to the same level as the square wave through a diode 17 and using the square wave to control the oscillator at the two zero signal points in each cycle. The output of the oscilator 18 is passed through a filter 20 and is presented to an output terminal 22. The signal present at the output terminal 22 is a sine wave having a frequency corresponding to the period between each two successive pulses applied to the input terminal 10.

Figure 2:
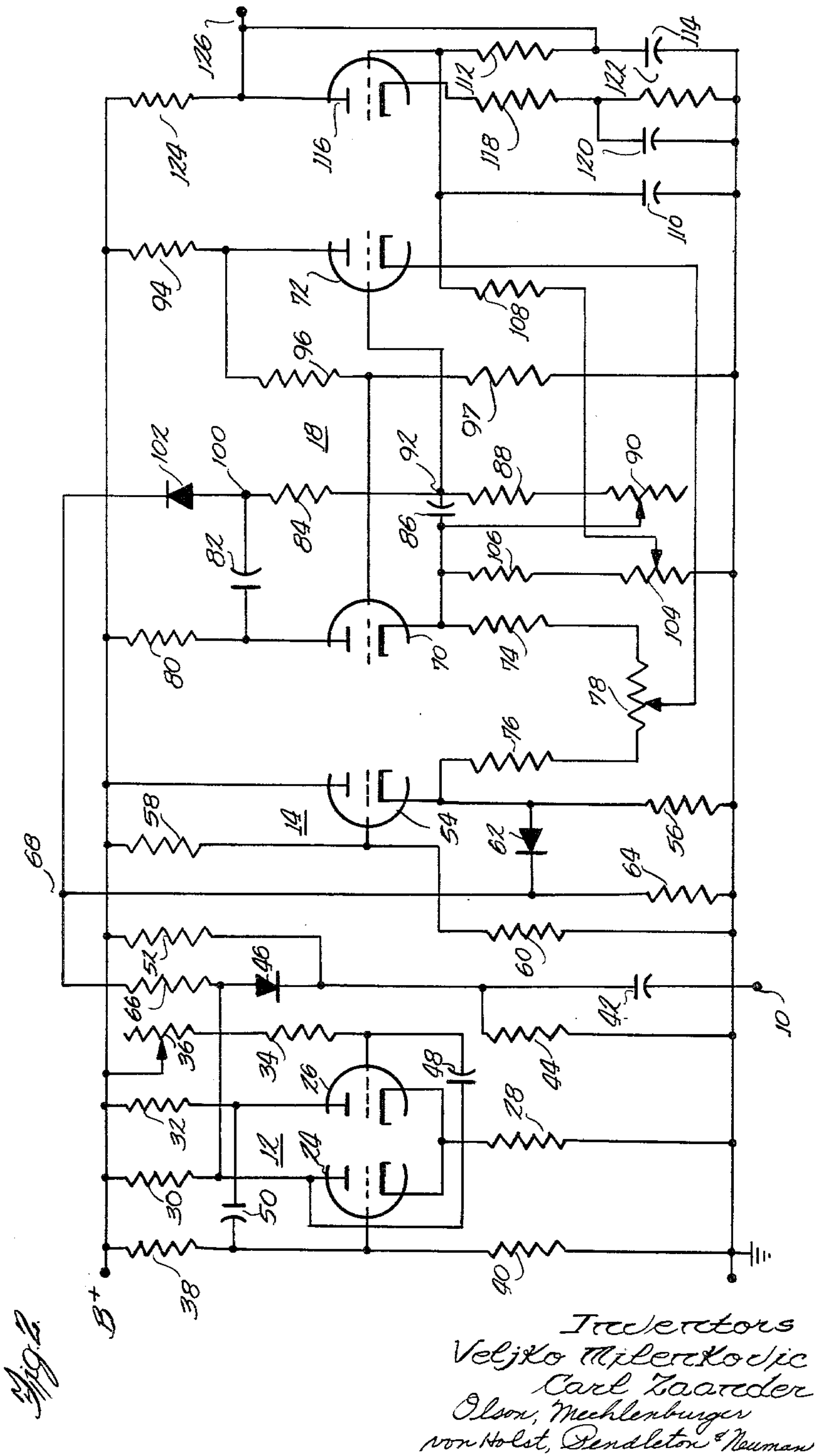
FIG. 2 is a schematic circuit diagram of a synchronous oscillator constructed in accordance with the present invention.

Referring now to FIG. 2, the monostable multivibrator 12 includes a pair of triodes 24 and 26 each having its cathode connected in common to ground through the common cathode resistor 28, and having its plate and grid cross coupled by the capacitors 48 and 50. Each of the triodes 24 and 26 is connected to B+ by a separate plate resistor 30 and 32, respectively. The triode 26 is normally conducting, and has its grid connected to B+ through a resistor 34 and a potentiometer 36. The triode 24 is normally biased off by the voltage drop across the common cathode resistor 28, its grid being normally held below this potential by a voltage divider comprising resistors 38 and 40 connected between B+ and ground, the junction of which is connected to the grid of the triode 24.

Synchronizing signals are applied to the terminal 10, and pass through a blocking capacitor 42 to appear across resistor 44 which is connected to ground. The synchronizing signals which are applied to the terminal 10 include pulses of negative polarity, and such pulses accordingly cause current to flow through the resistor 30 and a diode 46 during each sufficient negative excursion at the input terminal 10. The diode 46 blocks any positive pulses applied to the terminal 10. The increased voltage drop across the resistor 30 is transmitted to the grid of the triode 26 through the capacitor 48, thereby lowering the grid potential and quickly driving the triode 26 to cut-off.

As the state of conduction of the triode 26 is lowered, the voltage drop across the cathode resistor 28 is also lowered. Also, the increasing potential at the plate of the triode 26 is transmitted through the capacitor 50 to the grid of the triode 24. The combined effect of increased grid potential and decreased cathode potential permits the triode 24 to become conductive. As the triode 24 becomes conductive, the lowered potential at its plate is transmitted through the capacitor 48 to the grid of the triode 26, holding it cut off. The triode 24 remains conducting and the triode 26 remains cut off for a time dependent upon the time constant of the circuit including the capacitor 48, the resistor 34, and the potentiometer 36. The circuit including the capacitor 50 has a larger time constant, and so does not affect the operation at this time. At the expiration of this time, the charge on capacitor 48 reaches equilibrium so that charging current no longer holds triode 26 cut off and the triode 26 thereupon conducts, cutting off the triode 24 through the action of the cathode resistor 28 and the coupling capacitor 50.

A square wave output is taken from the plate of the triode 24 of the multivibrator and applied to a voltage divider including the resistors 66 and 64, and its more positive potential is loosely clamped through the diode 46 to a voltage determined by the voltage divider comprising the resistors 44 and 52. The more negative potential of the output signal from the multivibrator 12 is clamped more accurately by the operation of the cathode follower 14.

The cathode follower 14 includes a triode 54 having its plate connected to B+ and its cathode connected to ground through a cathode resistor 56. The triode 54 is grid biased into conduction by a voltage divider including the resistors 58 and 60, the junction of which is connected to the grid of the triode 54. A relatively constant voltage is, therefore, present at the cathode of the triode 54, which potential is substantially independent of the load on the triode 54. When the potential at the plate of the triode 24 of the multivibrator 12 starts to fall below such potential, a diode 62 conducts current from the cathode of the triode 54 through a resistor 64 connected to the output of the voltage divider including the resistors 64 and 66. The increased current through the resistor 64 results in an increased voltage at point 68, such as to maintain the voltage at that point relatively constant while the triode 24 of the multivibrator 12 is conducting. Over a wide range, such variations in current through diode 62 do not produce significant voltage variations at the cathode of triode 54.

The oscillator 18 includes a pair of triodes 70 and 72 which are interconnected to form a positive feedback circuit in the nature of a Wien bridge to produce oscillation. The cathode of the triode 70 is connected via the resistors 74 and 76 and a potentiometer 78 to the cathode of the triode 54, which, as has been indicated, presents a relatively constant voltage. The triode 70 also has a resistor 80 connected from its plate to B+, and an output circuit is connected between the plate and cathode of the triode 70. The output circuit includes a series RC network comprising a capacitor 82, a resistor 84, and a parallel RC network having a capacitor 86, a resistor 88 and a potentiometer 90.

The voltage impressed upon the series and parallel RC networks of the output circuit is equal to the voltage appearing between the plate and cathode of the tube 70. The potentiometer 90 is adjusted to give a time constant for the circuit including the capacitor 86, the resistor 88, and the potentiometer 90 which is equal to the time constant of the circuit including the capacitor 82 and the resistor 84. When this condition is realized, the current flowing through the output circuit, in parallel with the plate cathode path of the triode 70 is 45° out of phase with the voltage appearing across the circuit. The capacitor 82 and resistor 84 are chosen so that their reactances are substantially equal at the frequency of the input signals with which the oscillator is to be synchronized, so that voltage appearing at the point 92 is in phase with the plate-cathode voltage of the triode 70. The point 92 is connected to the grid of the triode 72 which functions as a direct coupled amplifier. The triode 72 has a plate resistor 94 connected to B+, and its cathode is connected to the tap of the potentiometer 78. The potentiometer 78 controls the cathode bias of the triode 72, and hence its gain. The position of the tap of the potentiometer is adjusted to obtain sustained oscillations.

The amplified voltage present at the plate of the triode 72 is connected to a voltage divider including the resistors 96 and 97, the junction of which is connected to the grid of the triode 70. It is apparent that the voltage appearing at the grid of the triode 70 is 180° out of phase with the voltage presented to the grid of the triode 72, which, as has been above described, is in phase with the voltage present between the plate and cathode of the triode 70. Hence, positive feedback is established and the circuit oscillates.

The frequency of oscillation is determined by the values of the capacitor 82, the resistor 84, the capacitor 86, the resistor 88, and the potentiometer 90, and is equal to $\frac{1}{2}\pi[C_{82}R_{84}C_{86}(R_{88}+R_{90})]^{\frac{1}{2}}$. The values of the components involved are, therefore, chosen to produce the desired frequency, about 500 c.p.s. in this preferred embodiment which is selected to be substantially the same as the reciprocal of the period between adjacent negative pulses applied to the input terminal 10.

Figure 4:
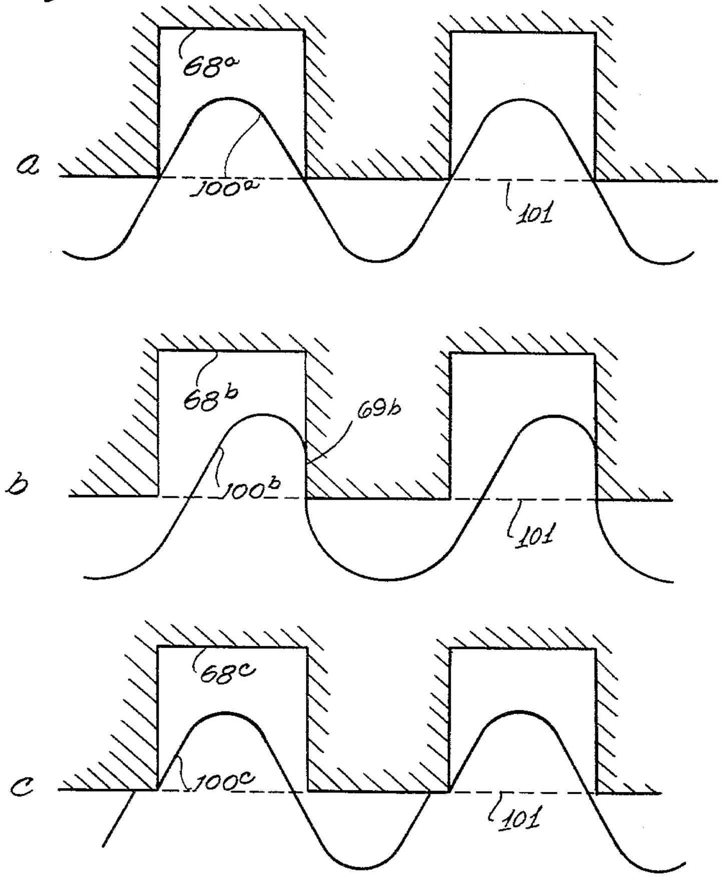

A resistor 106 and a potentiometer 104 are connected in series between the cathode of the triode 70, and ground, and the values of these components are chosen such that the D.C. level of the cathode of the triode 70 has a potential which is substantially equal to the reference potential at the cathode of the triode 54. Since the output circuit of the triode 70 includes the series capacitor 82, the amplitude of the sine wave produced by the oscillator 18 at the junction 100 between the capacitor 82 and the resistor 84, also has an average value equal to the potential at the cathode of the cathode follower triode 54. The potential at the point 10 is compared with the potential of the square wave present at the point 68 through a diode 102 connected between the points 100 and 68 and is clamped to the more negative of these potentials. During the operation of the synchronous oscillator, the wave forms produced at points 68 and 100 under several different conditions are illustrated in FIG. 4.

Figure 3:
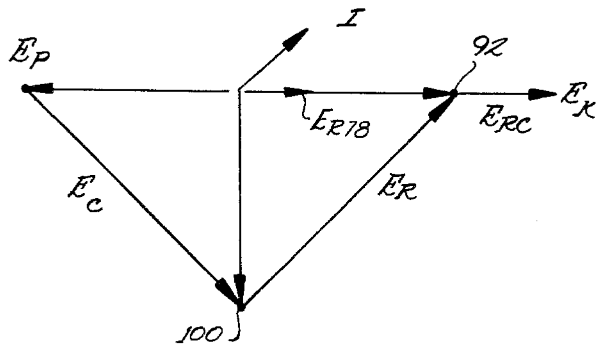
FIG. 3 is a phase diagram of voltages and currents occurring at various points in the circuit of FIG. 2 during its operation; and FIGS. *4a*, *4b* and *4c* are illustration of a series of graphs illustrative of the various modes of operation of the oscillator of FIG. 2.

FIG. 3 is a phase diagram of certain A.C. voltages and currents which are present in the circuitry of the oscillator 18 during its operation. As has been indicated above, the current through the output circuit of the triode 70 leads the plate-cathode voltage by a phase angle of 45°. This is indicated in FIG. 3 by the vector I, 45° out of phase with the plate-cathode voltage, represented by the vector difference between the vectors E*p* and E*k*, representative of the plate and cathode voltage, respectively. The voltage developed across the resistor 84 is in phase with the current I and the voltage across the capacitor 82 lags the network current by 90°, as indicated by the vectors $E_C$ and $E_R$. Since the impedances of these elements at the oscillating frequency are equal, it is apparent that the net voltage developed across the series combination of capacitor 82 and resistor 84 is in phase with the plate-cathode voltage. It is also clear that the voltage appearing across the parallel RC network including the capacitor 86, the resistor 88, and the potentiometer 90, also is in phase with the plate-cathode potential and lags the current I by 45°, as indicated by the vector $E_{RC}$.

In the phase diagram of FIG. 3, the point 100 is identified as the junction between $E_C$ and $E_R$, and the voltage at this point lags the plate cathode voltage of the triode 70 by approximately 90 degrees. This is the point which is clamped to the square wave potential during 180° of each cycle. It will be remembered that the voltage at point 100 is a sine wave having its average potential equal to the predetermined potential at the cathode of the triode 54. Twice during each cycle when the potential at point 100 passes through the reference potential, it is equal to the potential of the square wave. If, however, the oscillator frequency is slightly different from that of the square wave, the phase relationship of the vectors are corrected in the manner which will now be described in connection with FIGS. 4*b* and 4*c*.

Referring now to FIG. 4*a*, the wave form of the square wave at point 68 is indicated by the reference numeral **68*a* while the wave form of the sine wave appearing at point 100 and produced by the oscillator 18 is indicated by the reference numeral 100*a***. It will be noted from inspection of FIG. 4*a* that average voltage for the sine wave **100*a* is equal to the lower of the two square wave potentials indicated by broken line 101**. Since each of the two square wave potentials occupies 180° of each cycle and the phase and frequency are proper, it is apparent that during normal operation, both of the wave forms assume the same voltage magnitude twice during each cycle, corresponding to the times at which the square wave changes its potential.

If the frequency of the square wave increases, due to an increase in the frequency of pulses applied to the input terminal 10, the resulting wave forms are similar to those indicated in FIG. 4*b*, where the square wave is indicated as **68*b* and the sine wave is indicated as 100*b*. Since the sine wave frequency is relatively lower, more time is required to complete a full cycle of the sine wave frequency than a cycle of the square wave frequency. Accordingly, at each time that the square wave changes its potential from the higher value to the lower value, the potential of the sine wave is also caused to sharply reduce its potential along the curve portion 69*b*, since the clamp including the diode 102 (FIG. 2) does not permit the point 100 to be more positive than the point 68. Accordingly, when the square wave changes from its positive to negative value, there is a surge of current through the parallel RC network including the capacitor 86, the resistor 88, and the potentiometer 90, and through the resistor 84, as well as a surge to alter the charge on capacitor 82 which instantaneously changes the operating point of the oscillator 18 to the predetermined voltage approximately that established at the cathode of the triode 54. The oscillator thereafter immediately resumes its oscillation, after having been corrected by the clamping effect with respect to the square wave, and initiates a new cycle beginning at the reference potential. No oscillatory transients appear in the oscillator wave form due to the abrupt nature of the change of the potential at the point 100**, since no inductances are included in the circuit. Hence, there are no ringing effects resulting from the abrupt change in the operating point of the oscillator.

Similarly, when the frequency of the square wave decreases, due to a decrease in the frequency of the pulses presented to the input terminal 10, the oscillator frequency is higher than that of the square wave and the resulting wave forms are illustrated in FIG. 4*c*, the square wave being indicated at **68*c* and the sine wave as 100*c*. In this mode of operation a complete cycle of the sine wave terminates before the end of a complete cycle of the square wave, after which the point 100 is held at the reference potential 101 for the remainder of the square wave cycle. This is also due to the clamping effect of the diode 102**. At the end of the square wave cycle, a new sine wave cycle is initiated at the point where the square wave potential changes from the lower to the higher value. No transients occur in this mode of operation for the same reason as indicated above, namely, the absence of inductances.

The output of the oscillator 118 is taken from the wiper of the potentiometer 104, connected by a resistor 108 through a capacitor 110 to ground, the resistor 108 and the capacitor 110 forming a simple low-pass filter section which causes the high frequency components of the clamped wave form existing at the point 100 to be by-passed to ground. A triode 116 has its cathode connected to ground through a resistor 118 and a parallel RC network including a capacitor 120 and a resistor 122. The grid of the triode 116 is connected to the junction of the resistor 108 and the capacitor 110, and the triode 116 is, therefore, operative to amplify the relatively low frequencies passed through the low-pass filter section including the resistor 108 and the capacitor 110. The plate of the triode 116 is provided with a load resistor 124 connected to B+, and the plate of the triode 116 is connected to an output terminal 126.

The presence of the by-pass condenser 120 in the cathode circuit of the triode 116 decreases the cathode impedance at higher frequencies. The cathode impedance of the triode 116 is, therefore, greater at low frequencies and lesser at high frequencies, to amplify high frequencies more sharply than low frequencies. Accordingly, the triode 116 and its associated circuitry act as a band pass filter, the minimum attenuation of which is selected to be at the frequency of the oscillator 18. A capacitor 114 is connected between the output terminal 126 and ground, to further accentuate the low-pass filter characteristics of the circuit, while a resistor 112 is connected between the plate and grid of the triode 116, to supply negative feedback to increase the stability of the circuit and to decrease amplification of high frequencies. The output of the oscillator is therefore a substantially pure sine wave from which have been eliminated the higher order harmonics of the fundamental frequency, and also subharmonics or low frequency noise which may be present. It will be apparent, from inspection of the composite wave forms illustrated in FIGS. 4*b* and 4*c*, that the composite wave form is a complex frequency combination which has, as its fundamental frequency, the frequency which corresponds to the period of the square wave. More or less of higher order harmonics are also present in the composite wave forms to account for their discontinuities. However, when these have been eliminated the resulting, filtered, wave form is a pure sine wave at the desired frequency.

It will be appreciated that the oscillator of the present invention is operable to generate a sine wave identical in frequency to a series of pulses presented to the monostable multivibrator 12, and of a phase which bears a fixed relation to the beginning of one or the other of half cycles of the square wave. It will be recalled that one of the square wave half cycles is initiated by a negative pulse at the terminal 10, while the other is determined by the delay time of the RC circuit including the capacitor 48, the resistor 34, and the potentiometer 36. The potentiometer 36 of this circuit is set by an operator to give substantially equal half cycle times of a square wave generated by the multivibrator 12. If, however, this adjustment is not made with precision, the time in each square wave cycle at which the potential changes from its lower to its higher value, will not be precise. Hence, the initiation of the sine wave in the mode illustrated in FIG. 4*c* produces a sine wave which is slightly displaced in phase in relation to the pulses appearing at the terminal 10. For most applications, however, it is sufficient that the phase difference between the input pulses and the generated sine wave is constant, as it is even in the case of FIG. 4*c*. In all cases the frequency is identical to the pulse frequency applied to the terminal 10.

If the oscillator of the present invention is, however, used in an application requiring a known phase relation between the input pulses and the output sine wave, the oscillator frequency may be adjusted by providing variable capacitors for the capacitors 82 and 86, so that the oscillator operates in the mode illustrated in FIG. 4*b*, which causes both the frequency and phase to be identical to that of the input pulses. Alternatively, a feedback system such as one of those well-known in the prior art may be employed to automatically adjust the time constant of the delay circuit of a multivibrator 12 in response to unequal half cycles of the square wave being generated. One way of doing this is to rectify the square wave produced by the multivibrator 12 and compare the voltage produced by the rectifier to a standard voltage. The difference between the rectified and standard voltages can then adjust the time constant of the circuit including the capacitor 48, the resistor 34, and the potentiometer 36, by including a voltage responsive impedance, such as a vacuum tube or a transistor in series with this circuit. Several alternative methods of effecting this result will be obvious to those skilled in the art.

What we claim is:

1. A synchronous oscillator comprising a source of synchronizing signals, a monostable multivibrator connected to said source and responsive to said signals for generating a square wave having a first and a second level, a source of a predetermined potential, clamp means for clamping said first level to said source of a predetermined potential, a free running oscillator including first and second amplifiers each coupled in cascade with the other to form a positive feedback loop, said free running oscillator having a control terminal and an output terminal, means connecting said control terminal to said source of predetermined potential for setting the average level of said control terminal at said predetermined potential, clamp means for clamping said control terminal to the output of said monostable multivibrator for preventing said control terminal from exceeding the potential of said square wave, and filter means connected to said output terminal for filtering harmonics from the signal at said output terminal, whereby said fiter produces a sine wave synchronized in frequency and in phase with said synchronizing signals.

2. A synchronous oscillator comprising first signal generating means for generating a first A.C. output signal whose frequency is to be synchronized, second signal generating means for generating a second signal of varying potential for synchronizing the frequency of said first signal, said second signal having at least one predetermined potential, means coupled to said first and second signal generating means for comparing the potential of said first signal with the potential of said second signal, and means coupled to said comparing means for clamping the potential of said first signal to a value no greater than said predetermined potential of said second signal whenever said predetermined potential is present.

3. Apparatus according to claim 2, wherein said second signal generating means comprises a square wave generator, a source of input pulses, and means operative in response to said input pulses for initiating each cycle of said square wave generator, said predetermined potential having a duration equal to substantially one-half of each cycle of the square wave output of said second signal generating means.

4. Apparatus according to claim 3 wherein said square wave generator comprises a monostable multivibrator having means for switching said multivibrator to its unstable state in response to each of said input pulses, said multivibrator being adapted to return to its stable state a predetermined time after each of said pulses.

5. Apparatus according to claim 2 including clamp means connected to said second signal generating means and to a source of predetermined potential, whereby said second signal is prevented from having a value less than said predetermined potential.

6. Apparatus according to claim 2, wherein said first signal generating means comprises a Wien bridge oscillator having reactive components of only one sign.

7. Apparatus according to claim 2, including bias means connected to said first signal generating means wherein said bias means comprises impedance means connected between an output of said first signal generating means and a reference potential, and including means for causing a steady state current to flow through said impedance means whereby the average value of the output signal produced by said oscillator is set at a predetermined potential.

8. Apparatus according to claim 2, wherein said clamping means comprises a diode connected between an output of said first signal generating means and an output of said second signal generating means, said diode being poled to allow the output of said first signal generating means to have a maximum value equal to said predetermined potential whenever said predetermined potential is present.

9. Apparatus according to claim 2, including a low pass filter connected to the output of said first signal generating means, whereby harmonics of the fundamental frequency of said synchronous oscillator are substantially eliminated.

10. A synchronous oscillator for generating and synchronizing a wave form instantaneously in frequency and in phase with a square wave signal having two discrete signal levels, comprising means for generating a sine wave signal to be synchronized, means for generating said square wave signal, bias means coupled to said sine wave generating means for setting the average level of said sine wave signal substantially equal to one of the two levels of said square wave signal, means coupled to said sine wave generating means and said square wave generating means and operative to initiate a cycle of said sine wave commencing at said average level simultaneously with a transition from one to the other level of said square wave signal, and means operative in response to said transition during the next square wave cycle to initiate another cycle of said sine wave signal from said average level.

11. Apparatus according to claim 10 including means coupled to said sine wave generating means and said square wave generating means and operative in response to the completion of a complete cycle of said sine wave signal prior to the transition from one to the other level of said square wave signal for maintaining said sine wave signal at said average level until said transition occurs.

12. Apparatus according to claim 11 including means coupled to said sine wave generating means and said square wave generating means and operative in response to the occurrence of said transition prior to the completion of a complete cycle of said sine wave for immediately shifting the level of said sine wave signal to said average level and initiating another cycle of said sine wave signal commencing with said average level.

References Cited by the Examiner

UNITED STATES PATENTS

| | | | |
|---|---|---|---|
| 2,856,529 | 10/1958 | Mielke | 331—172 XR |
| 2,940,052 | 6/1960 | Van Winkle | 331—153 |
| 3,036,269 | 5/1962 | Trumpy | 307—88.5–8 |
| 3,099,712 | 7/1963 | Meacham | 328—63 XR |

ARTHUR GAUSS, *Primary Examiner.*